US011964288B2

(12) United States Patent
Park et al.

(10) Patent No.: US 11,964,288 B2
(45) Date of Patent: Apr. 23, 2024

(54) PRESSURE DRIVEN DIFFUSION TUBE FOR GROWING DROPLET

(71) Applicant: Environmental Monitoring Technologies, LLC, Cincinnati, OH (US)

(72) Inventors: Youngji Park, Cincinnati, OH (US); Sang Young Son, Cincinnati, OH (US)

(73) Assignee: Environmental Monitoring Technologies, LLC, Cincinnati, OH (US)

(*) Notice: Subject to any disclaimer, the term of this patent is extended or adjusted under 35 U.S.C. 154(b) by 974 days.

(21) Appl. No.: 16/767,647

(22) PCT Filed: Sep. 3, 2019

(86) PCT No.: PCT/US2019/049320
§ 371 (c)(1),
(2) Date: May 28, 2020

(87) PCT Pub. No.: WO2021/045724
PCT Pub. Date: Mar. 11, 2021

(65) Prior Publication Data

US 2021/0245177 A1 Aug. 12, 2021

(51) Int. Cl.
*B05B 1/24* (2006.01)
*B01D 47/05* (2006.01)
(Continued)

(52) U.S. Cl.
CPC ................ *B05B 1/24* (2013.01); *B01D 47/05* (2013.01); *B01D 53/78* (2013.01); *B05B 1/02* (2013.01); *G01N 15/06* (2013.01); *G01N 15/065* (2013.01)

(58) Field of Classification Search
CPC .... B05B 1/24; B05B 1/02; B05B 7/16; B01D 47/05; B01D 53/78; B01D 45/02;
(Continued)

(56) References Cited

U.S. PATENT DOCUMENTS

2010/0180765 A1 7/2010 Son et al.
2014/0033915 A1 2/2014 Hering et al.
(Continued)

FOREIGN PATENT DOCUMENTS

CN 1655829 A 8/2005
WO 03082355 A1 10/2003

OTHER PUBLICATIONS

International Search Report of PCT/US2019/049320 dated Nov. 27, 2019.
(Continued)

*Primary Examiner* — Christopher P Jones
*Assistant Examiner* — Phillip Y Shao
(74) *Attorney, Agent, or Firm* — Dinsmore & Shohl LLP; Yongsok Choi, Esq.

(57) ABSTRACT

A droplet generator includes a chamber including an enclosed space filled with gas having vapor, a tube extending through the chamber, a gas flow channel inside the tube, and a heater in the chamber. The tube includes a sidewall having an outer surface exposed to the enclosed space of the chamber, and an inner surface. The tube contains liquid. The heater is operable to change a phase of the liquid contained in the tube to vapor such that the vapor is provided into the enclosed space. A pressure in the enclosed space is higher than a pressure in the gas flow channel such that the vapor in the enclosed space flows to the gas flow channel by passing through the tube.

13 Claims, 12 Drawing Sheets

(51) Int. Cl.
*B01D 53/78* (2006.01)
*B05B 1/02* (2006.01)
*G01N 15/06* (2006.01)

(58) Field of Classification Search
CPC ...... B01D 45/08; G01N 15/06; G01N 15/065; G01N 1/2208; G01N 1/2214; G01N 1/2273; G01N 2001/2217; G01N 2001/2223; G01N 2001/2282; G01N 2001/2285; G01N 2015/0046; F01N 3/021; F01N 3/04; Y02T 10/12
See application file for complete search history.

(56) References Cited

U.S. PATENT DOCUMENTS

| | | | |
|---|---|---|---|
| 2014/0134623 | A1 | 5/2014 | Hiddessen et al. |
| 2017/0157583 | A1 | 6/2017 | Kulkarni et al. |
| 2018/0290154 | A1 | 10/2018 | Baxter |
| 2019/0015771 | A1 | 1/2019 | Son |

OTHER PUBLICATIONS

Extended European Search Report dated Aug. 30, 2022 pertaining to EP application No. 19944386.2 filed Mar. 22, 2022, pp. 1-9.
CN First Office Action dated Oct. 10, 2023 pertaining to CN application No. 201980101231.2 filed Apr. 11, 2022, pp. 1-7.

PRESSURE DRIVEN DIFFUSION TUBE FOR GROWING DROPLET

CROSS-REFERENCE TO RELATED APPLICATION(S)

This application is a national phase of Patent Cooperation Treaty (PCT) International Application Serial No. PCT/US19/49320, filed on Sep. 3, 2019, the entire contents of which are hereby incorporated by reference.

TECHNICAL FIELD

The present invention generally relates to droplet generators and methods thereof and, more particularly, to droplet generators that grow droplets by supplying vapor driven by pressure.

BACKGROUND

People are exposed to varying levels of volatile organic compounds, airborne pollutants, virus and bacteria, liquid droplets, and organic/inorganic particulates. The condensation particle counter (CPC), often known as condensation nucleus counter (CNC) is an instrument used for the measurement of submicron particles suspended in air. This instrument may utilize a droplet generator to grow small size particles into larger size droplets by the condensation of vapor-phase molecules onto the particle surface so that the particles may be optically detected. Thus, the CPC must create a supersaturated gas stream to effectuate the formation of the larger droplets.

Accordingly, droplet generators and methods for effectively creating a supersaturated gas stream may be desired.

SUMMARY

In one embodiment, a droplet generator includes a chamber including an enclosed space filled with gas having vapor; a tube extending through the chamber, a gas flow channel inside the tube, and a heater in the first chamber. The tube includes a sidewall having an outer surface exposed to the enclosed space of the chamber, and an inner surface. The tube contains liquid. The heater is operable to change a phase of the liquid contained in the tube to vapor such that the vapor is provided into the enclosed space. A vapor pressure in the first chamber is higher than a pressure in the gas flow channel such that the vapor in the first chamber flows to the gas flow channel by passing through the sidewall of the tube.

In another embodiment, a droplet generator includes a chamber including an enclosed space filled with gas having vapor, a plurality of tubes extending within the chamber, each of the plurality of tubes comprising a sidewall having an outer surface exposed to the enclosed space of the chamber, and an inner surface, a plurality of gas flow channels inside the plurality of tubes, and a plurality of heaters, each of the plurality of heaters operable to change a phase of the liquid contained in one of the plurality of tubes in the chamber to vapor such that the vapor is provided into the enclosed space. A pressure in the enclosed space of the chamber is higher than pressures in the plurality of gas channels such that the vapor in the enclosed space flows to the plurality of gas flow channels by passing through the sidewalls of the plurality of tubes.

In yet another embodiment, a method of for generating continuous droplets includes providing a tube within a chamber of a droplet generator, providing liquid to the tube of the droplet generator, heating, with a heater in the chamber, the tube in the chamber of the droplet generator to change a phase of liquid contained in the tube in the chamber to vapor such that the vapor is provided into an enclosed space of the chamber, flowing the vapor in the enclosed space to a gas flow channel inside the tube through a sidewall of the tube, and passing a particle-containing gas flow through the gas flow channel.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

FIG. 113 depicts an enlarged view of a portion of a tube, according to one or more embodiments shown and described herein;

DETAILED DESCRIPTION

Figure 1A:
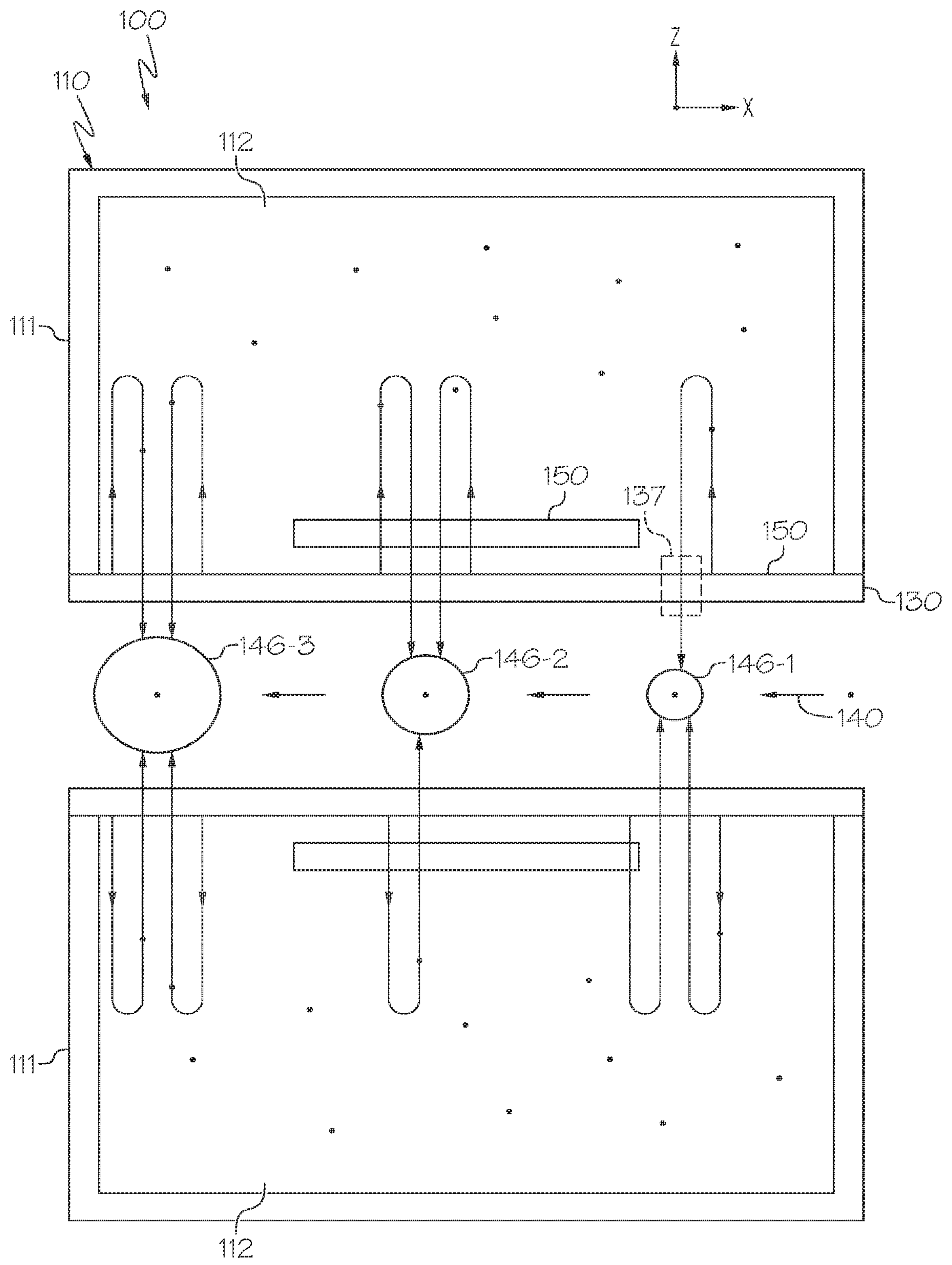
FIG. 1A depicts a cross sectional view of a droplet generator, according to one or more embodiments shown and described herein.

Reference will now be made in detail to aspects of various embodiment of the present disclosure, examples of which are illustrated in the accompanying drawings, wherein like reference numerals refer to the like elements throughout.

The embodiments described herein generally relate to condensation droplet generator devices and methods that may be used in conjunction with a condensation particle counter (CPC) or other devices that may require a particle, compound, biological agent and/or other small articles to be enlarged so that it may be detected and/or analyzed. More particularly, embodiments described herein are directed to droplet generators that grow droplets by supplying vapor driven by pressure. The droplet generator includes a first chamber, a second chamber containing liquid, a tube extending through the first chamber and the second chamber, and a heater. The tube includes a sidewall having an outer surface exposed to the first chamber and the second chamber, and an inner surface, a first opening at a side of the second chamber, a second opening at a side of the first chamber, and a gas flow channel inside the tube. The tube is configured to receive the liquid from the second chamber, and the heater is operable to change a phase of the liquid contained in the tube in the first chamber to vapor such that the vapor is provided into the first chamber. The pressure in the first chamber is higher than the pressure in the gas channel such that the vapor in the first chamber flows to the gas flow channel by passing through pores of the tube. The gas flow channel becomes super-saturated due to the flow of vapor from the first chamber.

The tube functions as a liquid flow channel that allows liquid from the second chamber to move toward the side of first chamber. That is, the tube serves as a medium for supplying liquid to the first chamber. In addition, the tube also provides vapor into the first chamber when heated by the heater. Furthermore, the tube includes a plurality of pores that allow the vapor in the first chamber to pass through the pores and flow into the gas flow channel via diffusion and vapor pressure difference between the first chamber and the gas flow channel.

The droplet generators and methods for generating droplet using the droplet generators will be described in more detail herein.

FIG. 1A depicts a cross sectional view of a droplet generator, according to one or more embodiments shown and described herein.

As illustrated in FIG. 1A, a chamber 110 includes an enclosed space 112 bounded by the housing 111 and a tube 130. Specifically, the enclosed space 112 is bounded by the housing 111 and the outer surface 132 of the tube 130. That is, the portion of the chamber 110 is excluded by the tube 130 that passes through the chamber 110. While FIG. 1A depicts the enclosed space 112 as a rectangular shape, the shape of the enclosed space 112 is not limited thereto. In embodiments, the central axis of the chamber 110 may be parallel with the central axis of the tube 130. For example, the central axis of the chamber 110 may overlap with the central axis of the tube 130. As another example, the central axis of the tube 130 may be deviated from the central axis of the chamber 110, however the central axis of the chamber 110 may be parallel with the central axis of the tube 130, The enclosed space 112 is filled with gas having vapor. The vapor may be water vapor, or vapor of any organic compound in which a hydroxyl group is bound to a carbon atom of an alkyl or substituted alkyl group including but not limited to isopropyl alcohol, butyl alcohol, methyl alcohol, ethyl alcohol, or any combination of water and such organic compounds. The gas in the enclosed space 112 may include non-condensable gas, such as gas previously dissolved in liquid.

The tube 130 has various functions. First, the tube 130 functions as a liquid flow channel that allows liquid from an external liquid supplier to move in −x direction via. the sidewall 136 by capillary action. Second, the tube 130 provides vapor into the chamber 110 when heated by the heater 150. For example, the liquid in the tube vaporize into the chamber 110 when heated by the heater 150. Third, the tube 130 includes a plurality of pores that allow the vapor in the first chamber 110 to pass through the pores and flow into the gas flow channel 142. For example, the tube 130 may be made of hydrophilic polymer having a pore structure, which will be described in detail with reference to FIGS. 1B and 1C.

As described in more detail below, the liquid in the sidewall 136 at the chamber 110 may be phase-changed into vapor by the heater 150. The liquid may be water, any organic compound in which a hydroxyl group is bound to a carbon atom of an alkyl or substituted alkyl group including but not limited to isopropyl alcohol, butyl alcohol, methyl alcohol, ethyl alcohol, or any combination of water and such organic compounds. The heater 150 may be installed at any location in the chamber 110. For example, the heater 150 may be installed at the outer surface 132 of the tube 130. As another example, the heater 150 may be installed over the outer surface 132 of the tube 130. The vapor flows into the enclosed space 112 of the chamber 110. The vapor in the chamber 110 is then delivered toward the gas flow channel 142 via the pores of the tube 130.

Figure 1B:
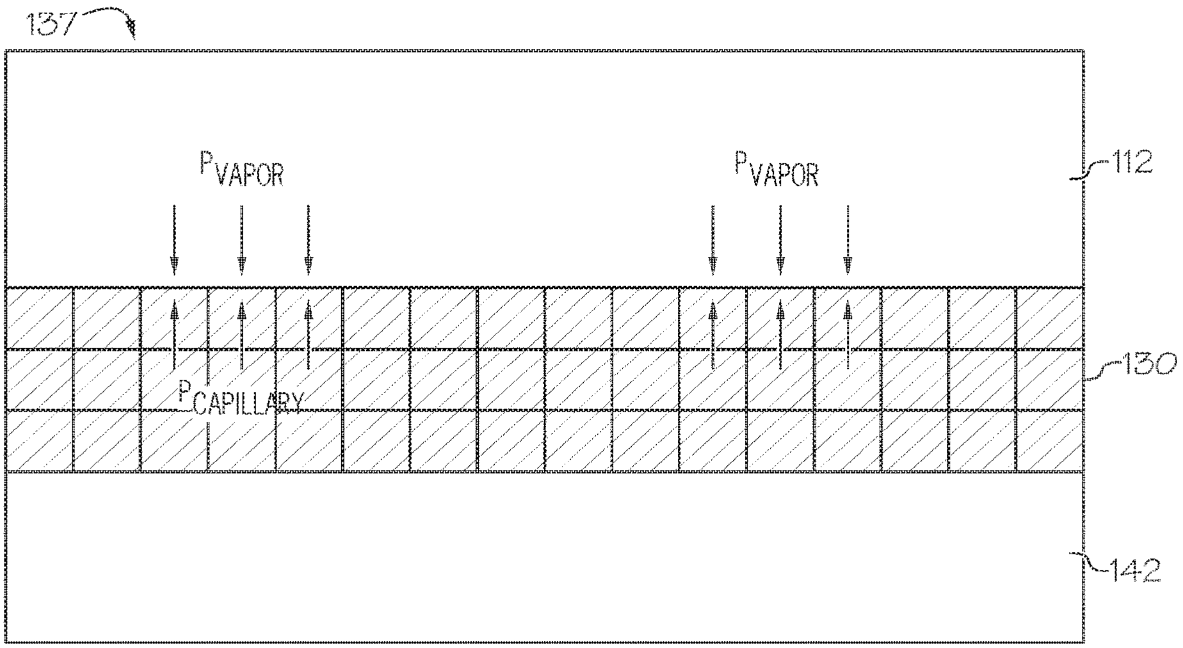
FIG. 1C depicts an enlarged view of a portion of a tube, according to one or more embodiments shown and described herein.
Figure 1C:
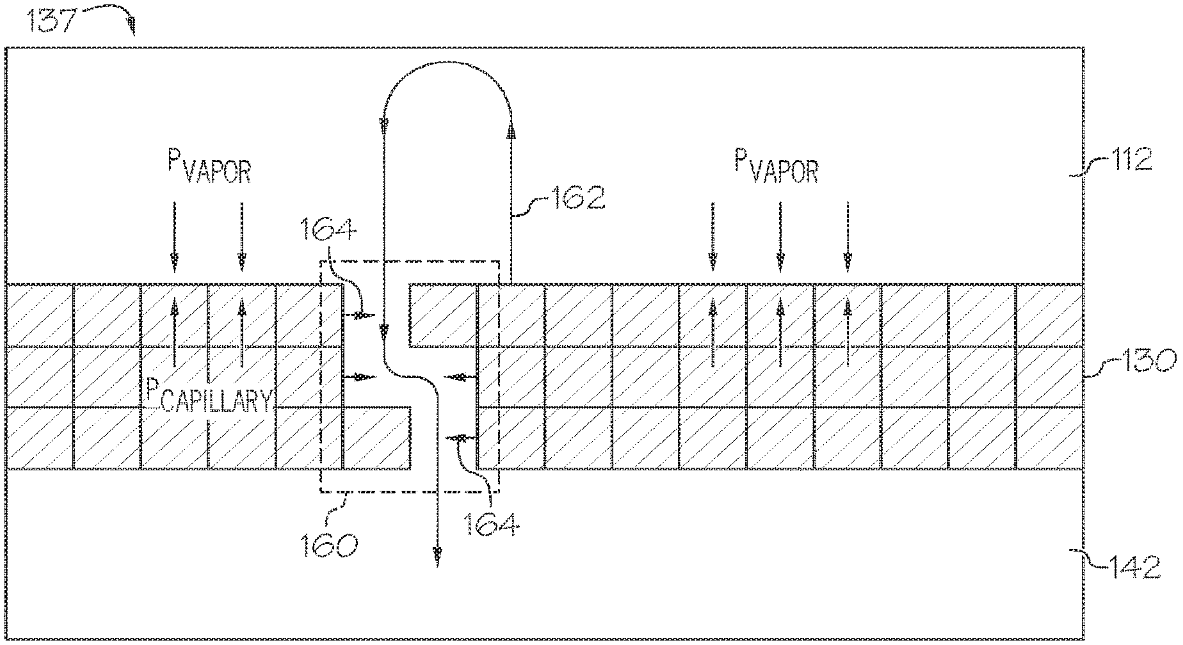

FIGS. 1B and 1C depict an enlarged view of the area 137 including a portion of the tube 130. The tube 130 may be made of hydrophilic polymer. For example, the tube 130 may be made of filter paper. The tube 130 may include cellulose fibers. The tube 130 includes porous structure having a plurality of pores. Liquid contained in the tube 130 fills the pores of the tube 130 as indicated as diagonal lines in FIG. 1B. It should be understood that the pores and overall pore structure of the tube 130 depicted in FIGS. 1B and 1C are for illustrative purposes only, as the pores may travel in any direction and have different sizes.

When the outer surface of the tube 130 is heated by the heater 150 (not shown in FIGS. 1B and 1C), the liquid contained in the tube 130 evaporates into the chamber 110 as indicated by arrows in FIG. 1A. When the temperature of the outer surface of the tube 130 is higher than the temperature of the inner surface of the tube 130, the evaporation of liquid starts at the outer surface of the tube 130. The generated vapor by evaporation may be accumulated in the enclosed space 112 of the chamber 110 as long as vapor pressure is also increased.

When the vapor pressure ($P_{vapor}$) in the enclosed, space 112 is smaller than the capillary pressure ($P_{capillary}$) in the tube 130, the vapor in the enclosed space 112 may be blocked by the liquid in the tube 130 and may not pass through the tube 130. Specifically, by referring to FIG. 1B, the vapor pressure ($P_{vapor}$) in the enclosed space 112 is smaller than the capillary pressure ($P_{capillary}$) in the tube 130. The capillary pressure ($P_{capillary}$) is determined by the pore size of porous structure, surface tension of the liquid in the tube 130, and a contact angle between the liquid and the pore structure. The capillary pressure can be estimated by Young-Laplace equation:

$$P_{capillary} = \sigma \cdot \cos\theta / d \quad \text{Equation (1)}$$

where $P_{capillary}$ is the capillary pressure, $\sigma$ is the surface tension of liquid 122, $\theta$ is the contact angle between liquid and pore structure, and d is the pore size. The vapor pressure ($P_{vapor}$) in the enclosed space 112 continues to increase as vapor is continuously introduced to the enclosed space 112 by the heater 150.

When the vapor pressure ($P_{vapor}$) reaches a certain level that is higher than the capillary pressure ($P_{capillary}$), the vapor pressure starts making one or more paths through the pore structure of the sidewall of the tube 130. By referring to FIG. 1C, for example, a path 160 is created in the pore structure of the sidewall of the tube 130. The shape and size of the path 160 may be randomly determined depending on dynamics of the vapor pressure ($P_{vapor}$) and the capillary pressure ($P_{capillary}$). The path 160 allows the vapor in the enclosed space 112 to pass through the tube 130 due the pressure difference in the pressure in the enclosed space 112 and the pressure in the gas flow channel 142. That is, the pressure in the enclosed space 112 is greater than the pressure in the gas flow channel 142 such that the vapor in the enclosed space 112 flows into the gas flow channel 142 as indicated by an arrow 162. Liquid in the tube 130 may vaporize along the path 160 as indicated by the arrows 164 such that vapor is supplied to the path 160, and flows into the gas flow channel 142.

The flow of vapor from the chamber 110 into the gas flow channel 142 increases the humidity within the gas flow channel 142 and makes the gas flow channel 142 in a super-saturated condition, thereby causing growth of the particles by condensation. For example, as shown in FIG. 1A, condensed droplets 146-1, 146-2, and 146-3 are formed upon the particles. The temperature of vapor in the chamber 110 is higher than the temperature of the gas including particles in the gas flow channel 142. Thus, the vapor from the chamber 110 may easily condense upon particles and droplets including particles.

Referring to FIG. 1A, the tube 130 is configured to induce the particle-containing gas flow 140 into the gas flow channel 142 inside the tube 130. The particle-containing gas flow 140 may include any number of various particles including, but not limited to, diesel particles, microbes, chemical compounds, etc. The particle-containing gas flow 140 may also include volatile organic compounds, chemical gas, virus and bacteria, etc. The carrier of the particle-containing gas flow 140 may be a gas such as oxygen or nitrogen, for example. The particle-containing gas flow 140 may be continuously drawn into the first opening 133 by any means. As an example and not a limitation, a suction pump (not shown) may be utilized to draw particle-containing air into the tube 130. As the particle-containing gas flow 140 traverses the gas flow channel 142 in −x direction, condensed droplets are formed upon the particles, for example, droplets 146-1, 146-2, and 146-3 which then exit the gas flow channel 142 on a continuous basis. The particles may be nanoscale particles and serve as seeds to become water droplets. The condensed droplets become bigger and gain weight as they move through the gas flow channel 142 because more vapor comes in contact with and condenses on the droplets as the droplets travel within a super-saturated area. In this regard, a nanoscale particle grows to microscale water droplet.

By growing the volume (i.e., mass) of droplets (e.g., 146-1, 146-2, 146-3), the inertia of droplets also increases rapidly in proportion to volume increase. For example, the droplet generator 100 grows a particle (e.g., a 10-nm particle) to a 3-micron water droplet in less than 0.3 seconds. The original inertia of the particle increases 2.7 million times in 0.3 seconds during passage through the droplet generator 100.

Figure 2A:
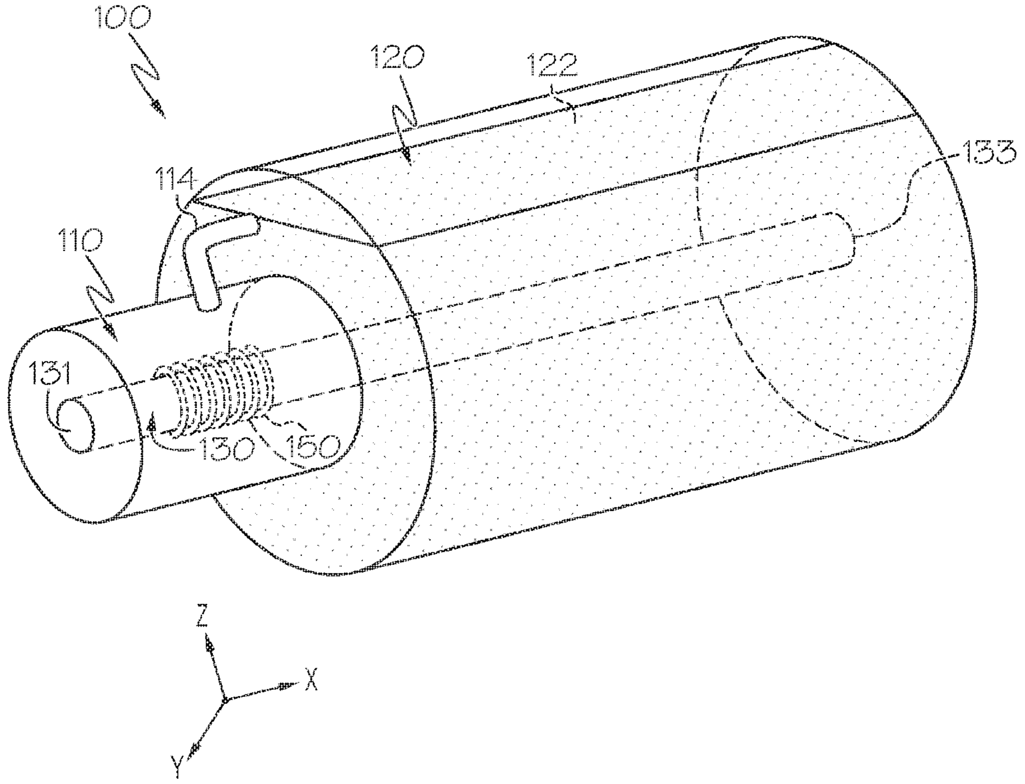
FIG. 2A depicts a schematic of a droplet generator according to one or more embodiments illustrated and described herein.
Figure 2B:
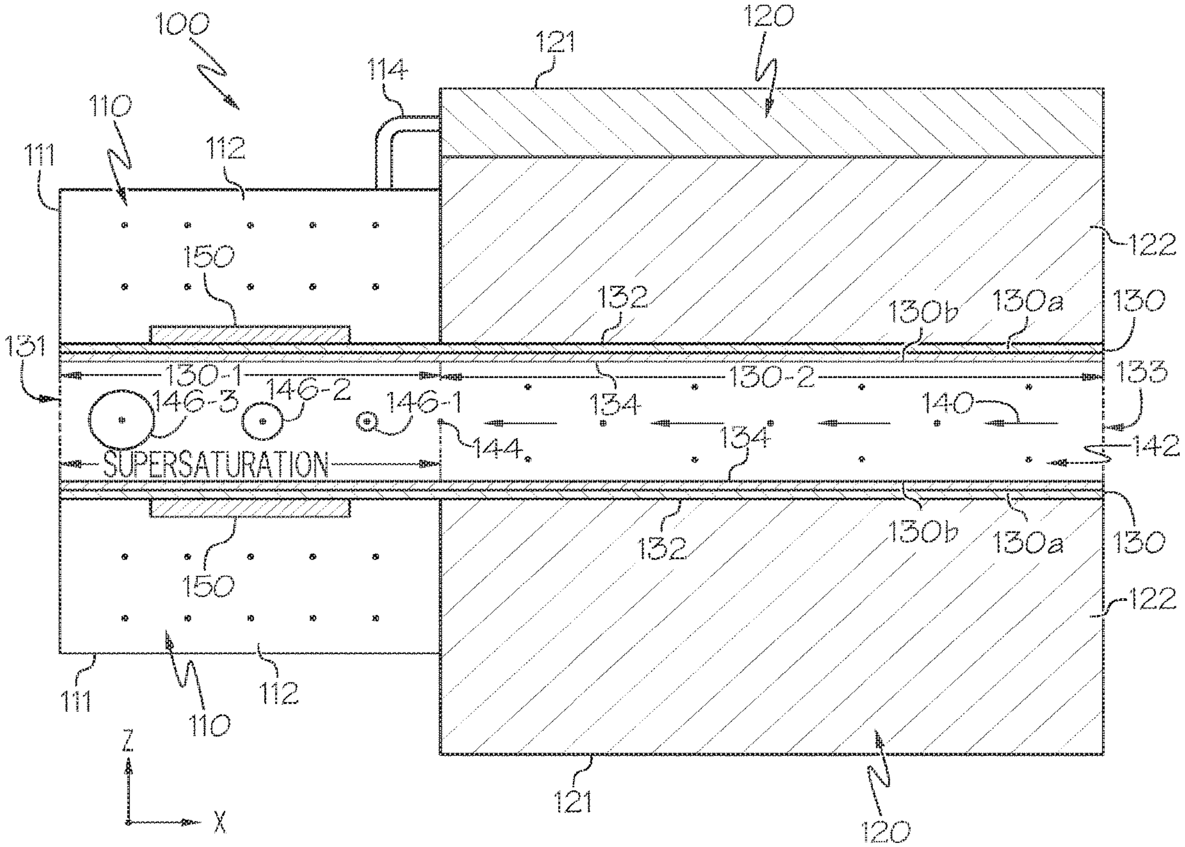
FIG. 2B depicts a cross sectional view of the droplet generator in FIG. 1A according to one or more embodiments illustrated and described herein.

Referring now to FIG. 2A, a droplet generator 100 according to one embodiment is illustrated. The illustrated embodiment generally comprises a first chamber 110, a second chamber 120, a tube 130, and a heater 150. As shown in FIG. 2A, the tube 130 extends through the first chamber 110 and the second chamber 120 along the x-axis. The tube 130 includes a first opening 133 at a side of the second chamber 120 and a second opening 131 at a side of the first chamber 110. The heater 150 is within the first chamber 110 and surrounds a portion of the outer surface 132 of the tube 130 as shown in FIG. 2B. The first chamber 110 may be connected to the second chamber 120 via a bypass channel 114. In some embodiments, the droplet generator 100 may not include the bypass channel 114.

The second chamber 120 is configured to maintain liquid 122, which may be water, any organic compound in which a hydroxyl group is bound to a carbon atom of an alkyl or substituted alkyl group including but not limited to isopropyl alcohol, butyl alcohol, methyl alcohol, ethyl alcohol, or any combination of water and such organic compounds. The liquid 122 may be absorbed by the tube 130 in the second chamber 120 and the absorbed liquid may move in −x direction by capillary force (i.e., move toward the first chamber 110). The heater 150 in the first chamber 110 changes a phase of the liquid contained in the tube 130 to vapor such that the vapor is provided into the first chamber 110.

FIG. 2B depicts a cross sectional view of the droplet generator 100 in FIG. 1A on the x-z plane. As illustrated in FIGS. 2A and 2B, the first chamber 110 includes an enclosed space 112. The enclosed space 112 is bounded by the first housing 111 and a first portion 130-1 of the tube 130. Specifically, the first chamber 110 is bounded by the first housing 111 and the outer surface 132 of the first portion 130-1 of the tube 130. That is, the portion of the first chamber 110 is excluded by the tube 130 that passes through the first chamber 110. While FIG. 2A depicts the first chamber 110 as a cylindrical chamber, the shape of the first chamber 110 is not limited thereto, and the first chamber 110 may have different shapes. In embodiments, the central axis of the first chamber 110 may be parallel with the central axis of the tube 130. For example, the central axis of the first chamber 110 may overlap with the central axis of the tube 130. As another example, the central axis of the tube 130 may be deviated from the central axis of the first chamber 110, however the central axis of the first chamber 110 may be parallel with the central axis of the tube 130.

As illustrated in FIGS. 2A and 2B, the second chamber 120 is bounded by the second housing 121 and a second portion 130-2 of the tube 130. Specifically, the second chamber 120 is bounded by the second housing 121 and the outer surface 132 of the second portion 130-2 of the tube 130. That is, the portion of the second chamber 120 is excluded by the tube 130 that passes through the second chamber 120. While FIG. 2A depicts the second chamber 120 as a cylindrical chamber, the shape of the second chamber 120 is not limited thereto, and the second chamber 120 may have different shapes. In embodiments, the central axis of the second chamber 120 is parallel with the central axis of the tube 130. For example, the central axis of the second chamber 120 may overlap with the central axis of the tube 130. As another example, the central axis of the tube 130 may be deviated from the central axis of the second chamber 120, however the central axis of the second chamber 120 may be parallel with the central axis of the tube 130.

As described above with reference to FIG. 2A, the second chamber 120 is configured to maintain liquid 122. The first chamber 110 and the second chamber 120 are separated from each other such that the liquid 122 in the second chamber 120 does not flow into the first chamber 110 except via the tube 130. The second housing 121 may include a liquid inlet (not shown) to fill the second chamber 120 with the liquid 122. In embodiments, the second chamber 120 may be fully filled with the liquid 122, or partially filled with the liquid 122.

As illustrated in FIGS. 2A and 2B, the tube 130 includes the first opening 133 at the side of the second chamber 120, and the second opening 131 at the side of the first chamber 110. The tube 130 includes a sidewall 136 having the outer surface 132 and an inner surface 134. The sidewall 136 may be of any suitable geometry, such as cylindrical or rectangular, for example, and may have a thickness between about 0.5 micrometers and 5 centimeters.

The tube 130 has various functions. First, the tube 130 provides a separation between the liquid 122 maintained within the second chamber 120 and a gas flow channel 142. Second, the tube 130 functions as a liquid flow channel that allows liquid from the second chamber 120 to move toward the side of first chamber 110 via the sidewall 136 by capillary action. For example, the liquid 122 in the second chamber 120 is absorbed by the second portion 130-2 of the tube 130, and the absorbed liquid flows to the first portion 130-1 of the tube 130. Third, the tube 130 provides vapor into the first chamber 110 when heated by the heater 150. For example, the liquid in the first portion 130-1 of the tube vaporize into the first chamber 110 when heated by the heater 150. Fourth, the tube 130 includes a plurality of pores that allow the vapor in the first chamber 110 to pass through the pores and flow into the gas flow channel 142 via diffusion and vapor pressure difference between the first chamber 110 and the gas flow channel 142.

As described in above with reference to FIGS. 1A and 1B, the liquid in the sidewall 136 at the first chamber 110 may be phase-changed into vapor by the heater 150 in the first chamber 110 and the vapor flows into the first chamber 110. The vapor in the first chamber 110 is then delivered toward the gas flow channel 142 via one or more paths through the pore structure of the sidewall of the tube 130. The one or more paths are generated as described above with reference to FIGS. 1B and 1C.

Referring to FIGS. 2A and 2B, the first opening 133 is configured to induce the particle-containing gas flow 140 into the gas flow channel 142 inside the tube 130. The particle-containing gas flow 140 may include any number of various particles including, but not limited to, diesel particles, microbes, chemical compounds, etc. The particle-containing gas flow 140 may also include volatile organic compounds, chemical gas, virus and bacteria, etc. The carrier of the particle-containing gas flow 140 may be a gas such as oxygen or nitrogen, for example. The particle-containing gas flow 140 may be continuously drawn into the first opening 133 by any means. As an example and not a limitation, a suction pump (not shown) may be utilized to draw particle-containing air into the first opening 133. As the particle-containing gas flow 140 traverses the gas flow channel 142 in −x direction, condensed droplets are formed upon the particles, for example, droplets 146-1, 146-2, and 146-3 which then exit the gas flow channel 142 at the second opening 131 on a continuous basis. The particles may be nanoscale particles and serve as seeds to become water droplets. The condensed droplets become bigger and gain weight as they move through the gas flow channel 142 because more vapor comes in contact with and condenses on the droplets as the droplets travel within a super-saturated area. In this regard, a nanoscale particle grows to microscale water droplet.

By growing the volume (i.e., mass) of droplets (e.g., 146-1, 146-2, 146-3), the inertia of droplets also increases rapidly in proportion to volume increase. For example, the droplet generator 100 grows a particle (e.g., a 10-nm particle) to a 3-micron water droplet in less than 0.3 seconds. The original inertia of the particle increases 2.7 million times in 0.3 seconds during passage through the droplet generator 100.

While the droplets grow and gain weight as they move through the gas flow channel 142, the droplets may also collect volatile organic compounds (VOCs) and/or gaseous chemical. The droplets serve as media to collect VOCs and/or chemical gas. VOCs and/or gaseous chemical near the surface of the water droplet (e.g., 146-1, 146-2, 146-3) spontaneously move to the surface by diffusion from a region of higher chemical concentration (e.g., a region outside the water droplets) to a region of lower concentration of the surface of water droplets. While the droplets grow, vapor generated from the first chamber 110 continuously condenses on the surface of droplets. Newly condensed vapor makes the concentration of droplet lower. Thus, the droplets continuously collect the VOC and gaseous chemical without saturation. The VOC and/or gaseous chemical diffusion to water droplet can be explained by Fick's law below.

$$J_{VOC} = -\text{Area} \cdot C_{total} \cdot D_{VOC} \cdot \frac{dC_{VOC}}{dC_{total}} \quad \text{Equation (2)}$$

$$I_{VOC} = -\text{Area} \cdot C_{total} \cdot D_{VOC} \cdot \frac{C_{VOC}}{C_{total}}$$

where $J_{VOC}$ is diffusive VOC (and/or gaseous chemical) transfer rate (kmol/second), Area is surface area ($m^2$) of water droplet, $C_{total}$ is total concentration ($kmol/m^3$), $D_{VOC}$ is the diffusivity of VOC (and/or gaseous chemical) in the mixture ($m^2$/second), and $$\frac{dC_{VOC}}{dC_{total}} \frac{c_{VOC}}{c_{total}}$$

is the concentration ratio between VOC (and/or gaseous chemical) and mixture. The second opening 131 can be connected with an external sensing device (not shown) for analyzing generated droplets (e.g., a particulate filter, a particle collector, a particle counter, a particle analyzer, a chemical analyzer, a bio-marker analyzer, or a bio-species analyzer). The external sensing device may be in communication with an additional system or subsystem by wireless or wired communication. For example, the external sensing device may be communicably coupled to a remote computer by a wireless network such as a cellular network, a satellite communications network, a WiFi network and the like. Although not illustrated in the figures, embodiments described herein may also include a saturator/pre-conditioner section prior to the tube 130 by which the particle-containing gas flow 140 may be conditioned to a specified temperature and saturation ratio before entering the tube 130. For example, the temperature of the particle-containing gas flow 140 may be lowered by a cooling element prior to entering the first opening 133 of the tube 130.

In the embodiment illustrated in FIG. 2B, the first chamber 110 may be connected to the second chamber 120 via the bypass channel 114. The bypass channel 114 is operable to regulate the internal pressure of the first chamber 110. For example, if the pressure in the first chamber 110 is excessively greater than the pressure in the second chamber 120 (e.g., a difference between the pressure in the first chamber 110 and the pressure in the second chamber 120 is greater than a predetermined value), a port of the bypass channel 114 opens and allows the −vapor in the first chamber 110 to flow into the second chamber 120. Lowering pressure in the first chamber 110 and increasing pressure in the second chamber 120 may enhance capillary force that draws the liquid 122 in the tube 130 toward −x direction and help the liquid 122 flow in −x direction following the tube 130. Thus, the control of the pressure in the first chamber 110 may facilitate supply of vapor into the first chamber 110.

Figure 4A:
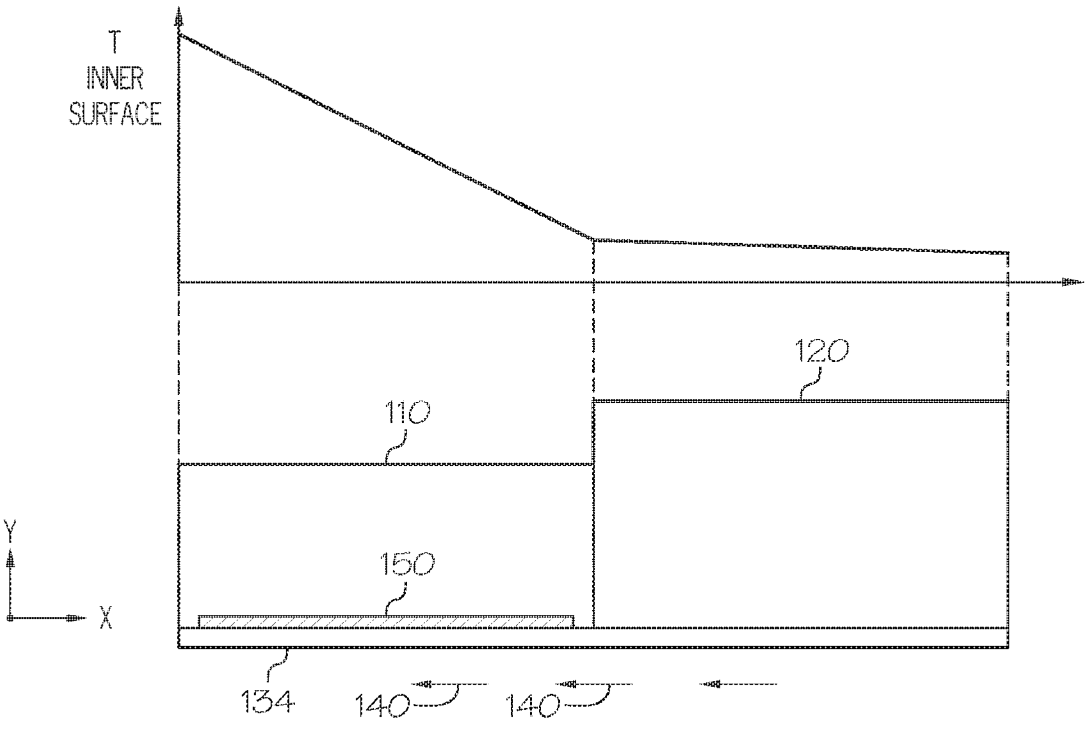
FIG. 4A illustrates the temperature of the inner surface of a tube along the direction of a particle-containing gas flow according to one or more embodiments shown and described herein.
Figure 4B:
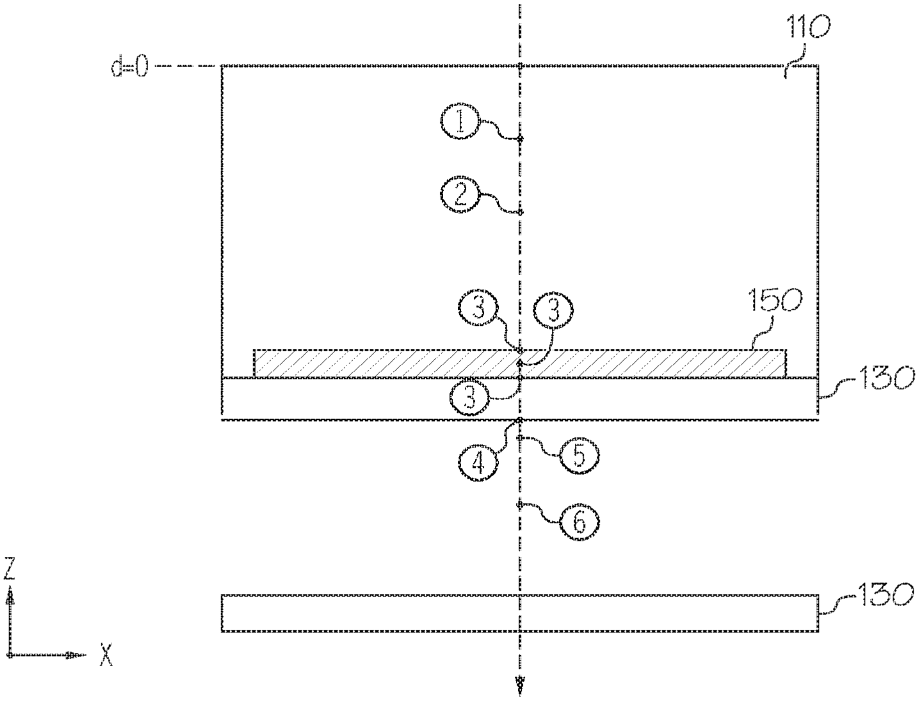
FIG. 4B illustrates temperature measuring points in a portion of the first chamber of the droplet generator, according to one or more embodiments shown and described herein.
Figure 4C:
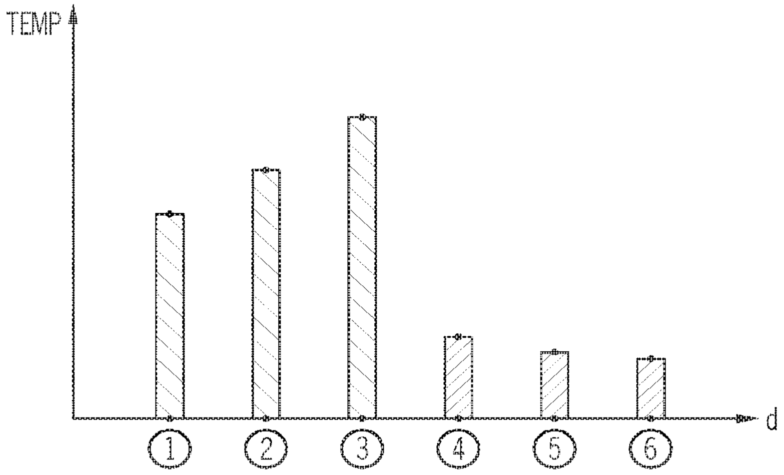
FIG. 4C illustrates a graph showing temperature distribution corresponding to the temperature measuring points in FIG. 4B.

The heater 150 may surround a portion of the outer surface 132 of the tube 130 in the first chamber 110. For example, the heater 150 may be a wire made of a heating element material that is wrapped around the outer surface 132 of the first portion 130-1. The heater 150 provides thermal energy for phase changing liquid contained in the tube 130 and produces a temperature gradient that is perpendicular to the direction of the particle-containing gas flow 140. For example, FIG. 4A illustrates the temperature of the inner surface 134 of the tube 130 along the direction of the particle-containing gas flow 140. The heater 150 may include a heating element that generates heat upon receiving a control electrical current or voltage, FIG. 4B illustrates temperature measuring points in a portion of the first chamber of the droplet generator, according to one or more embodiments shown and described herein. FIG. 4C illustrates a graph showing temperature distribution corresponding to the temperature measuring points in FIG. 4B. As shown in FIG. 4C, the temperature at the point ③ (i.e., the heater body and contact surface with the outer surface 132 of the tube 130) is the highest and the temperature decreases as the temperature measurement point moves in +z direction. Similarly, the temperature may decrease as the temperature, measurement point moves in −z direction from the point ③, and become lowest at the center of the gas flow channel 142 (i.e., at point ⑥). As shown in FIG. 4C, because the temperature of vapor in the first chamber 110 is relatively higher than the temperature of gas and/or particles in the gas flow channel 142, the vapor from the first chamber 110 may easily condense upon particles and droplets including particles in the gas flow channel 142. Additionally, as shown in FIG. 4C, the temperature at the point ③ (i.e., heater body and contact surface with the outer surface 132 of the tube 130) is higher than the temperature at the point ④ (i.e., the inner surface 134 of the tube 130). Thus, the vaporization of liquid in the tube 130 occurs at the outer surface 132 of the tube 130, and the vapor is supplied into the first chamber 110.

Figure 5:
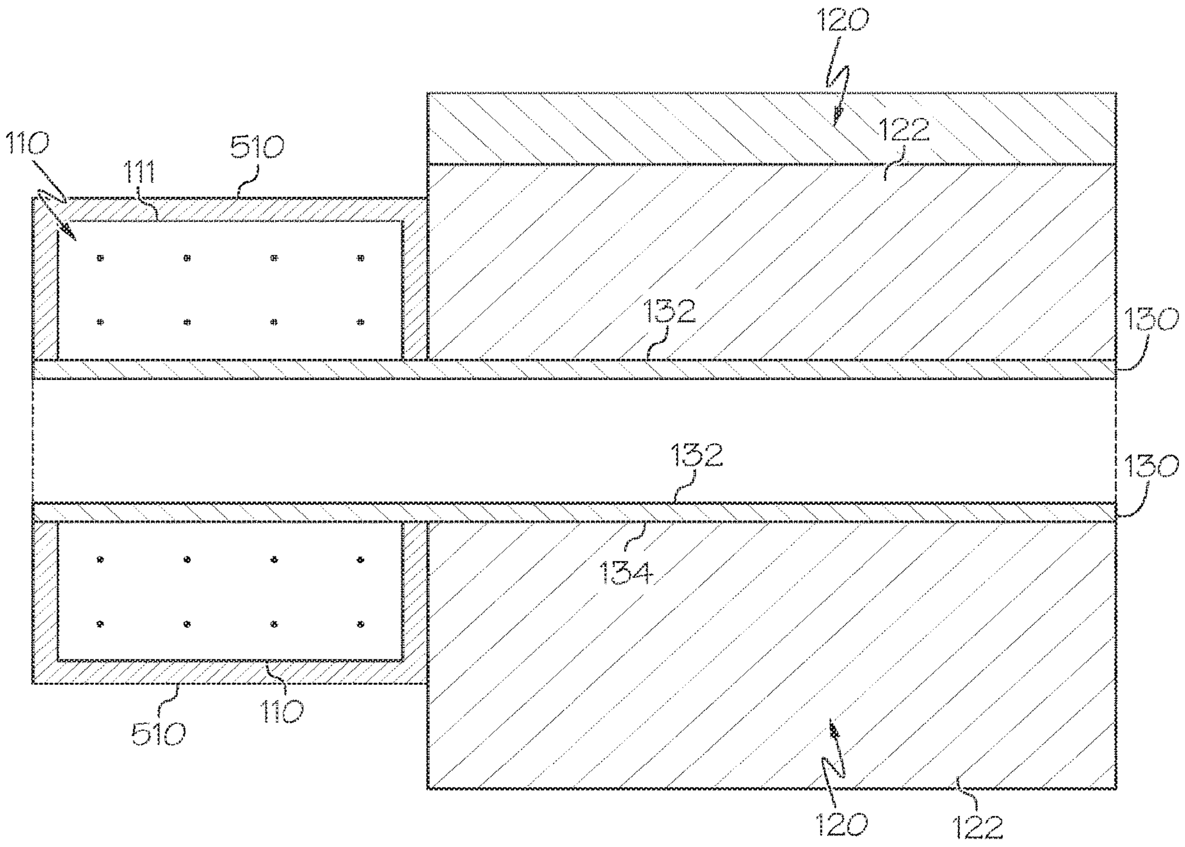
FIG. 5 depicts a cross sectional view of a droplet generator according to another embodiment illustrated and described herein.

Although FIGS. 1A and 1B illustrate the heater 150 as surrounding the outer surface 132 of the tube 130, other configurations are also possible. In some embodiments, as illustrated in FIG. 5, the heater 510 may be configured to surround the first housing 111 of the first chamber 110. The heater 510 may surround an entire or portion of the first housing 111 of the first chamber. In this embodiment, the liquid in the first portion 130-1 of the tube 130 may be indirectly heated by the heater 510 and the liquid on the outer surface 132 of the tube 130 evaporates into the first chamber 110.

Figure 6A:
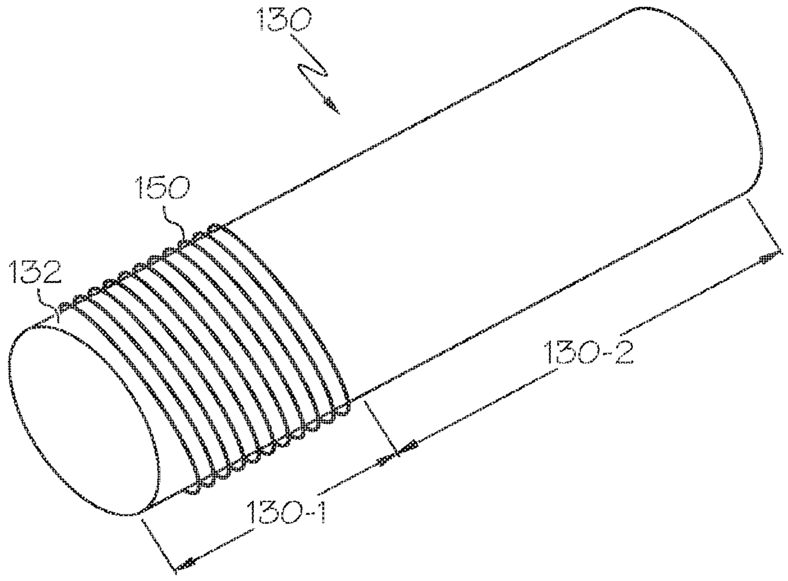
FIG. 6A depicts a schematic structure of a tube and a heater surrounding the tube according to one or more embodiments shown and described herein.

In some embodiments, the length of the heater 150 may be adjusted such that it provides heat to the entire length or a portion of the outer surface 132 of the tube 130 or the first housing 111 to provide optimal operating conditions. For example, as illustrated in FIG. 6A, the heating wire of heater 150 surrounds only the central portion of the first portion 130-1 of the tube 130. In this example, the heating wire may densely wrap around the outer surface 132 such that the central portion of the outer surface 132 of the first portion 130-1 is not substantially exposed to the first chamber 110 (not shown in FIG. 6A) whereas the rest of the outer surface 132 is exposed to the first chamber 110. The exposed outer surface 132 may include a plurality of pores and allow vapor in the first chamber 110 to flow into the gas flow channel 142 via the plurality of pores of the tube 130.

Figure 6B:
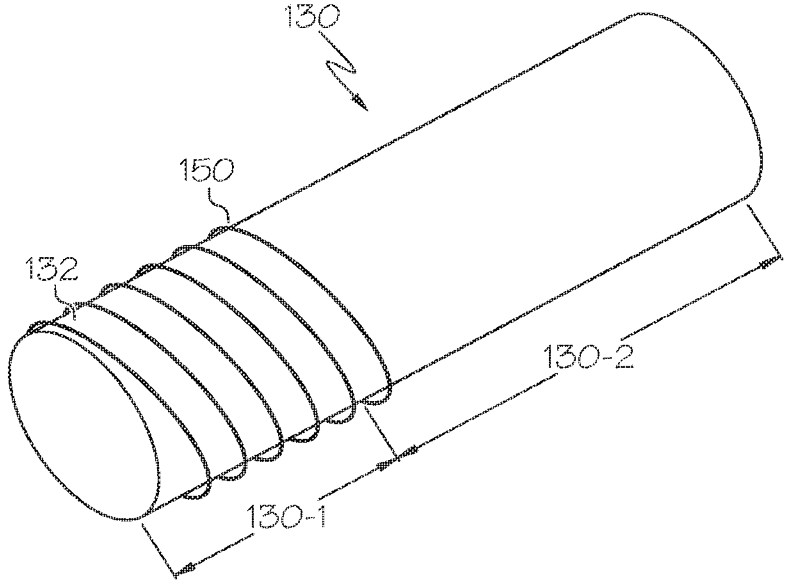
FIG. 6B depicts a schematic structure of a tube and a heater surrounding the tube according to another embodiment shown and described herein.
Figure 6C:
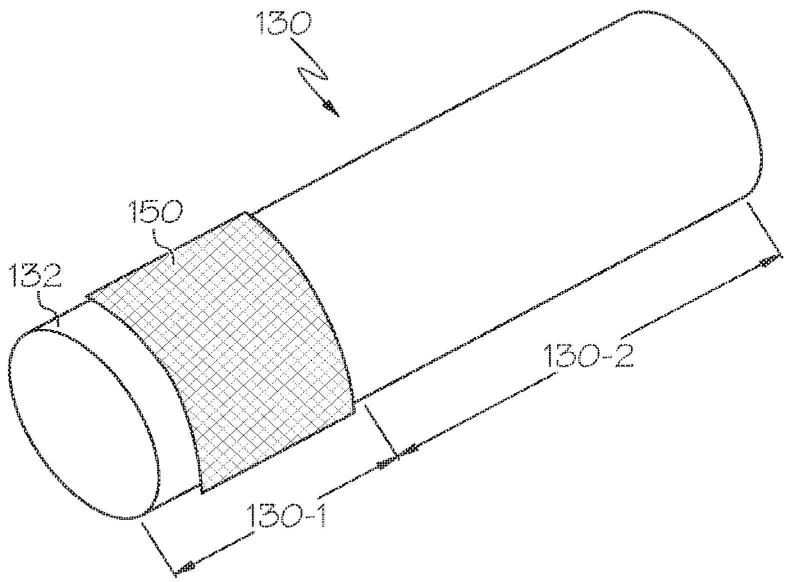
FIG. 6C depicts a schematic structure of a tube and a surface heater surrounding the tube according to another embodiment shown and described herein.

As another example, as illustrated in FIG. 6B, the heating wire of the heater 150 surrounds the entire of the first portion 130-1 of the tube 130. In this example, the heating wire may sparsely wrap around the outer surface 132 of the first portion 130-1 of the tube 130 such that outer surface 132 is exposed between wrapping wires. The exposed outer surface 132 between wrapping wires may include a plurality of pores and allow vapor in the first chamber 110 to flow into the gas flow channel 142 via the plurality of pores. As another example, as illustrated in FIG. 6C, a surface heater may surround a portion of the tube 130.

By still referring to FIG. 2B, in some embodiments, the tube 130 may include two layers of wall including an outer wall 130A and an inner wall 130B. The outer wall 130A may be a hydrophilic layer and the inner wall 130B may be a hydrophobic layer. The outer wall 130A functions similar to the sidewall 136 described above. For example, the outer wall 130A functions as a liquid channel that allows liquid from the second chamber 120 to move toward the side of first chamber 110 via the sidewall 136 by capillary action, and provides vapor into the first chamber 110 when heated by the heater 150. The outer wall 130A also includes a plurality of pores that allow the vapor in the first chamber 110 to pass through the pores and flow into the gas flow channel 142 via diffusion and/or vapor pressure difference between the first chamber 110 and the gas flow channel 142.

The inner wall 130B may be constructed from one or more hydrophobic layers that comprise nano- or microsize pore structures having a plurality of pores. The inner wall 130B which includes one or more hydrophobic layers prevents liquid from entering the gas flow channel 142 and disrupting the particle-containing gas flow 140. In wetting wall devices, liquid may enter the tube due to external forces such as shock or may only operate effectively in a vertical orientation. The inner wall 130B may include a plurality of pores that allow the vapor in the first chamber 110 to pass through the pores and flow into the gas flow channel 142 via diffusion and/or vapor pressure difference between the first chamber 110 and the gas flow channel 142. While the liquid in the outer wall is prevented from passing through the inner wall 130B because the inner wall 130B is a hydrophobic layer, the vapor in the first chamber 110 may pass through the plurality of pores of the inner wall 130B based on diffusion and/or vapor pressure difference between the first chamber 110 and the gas flow channel 142.

Figure 3:
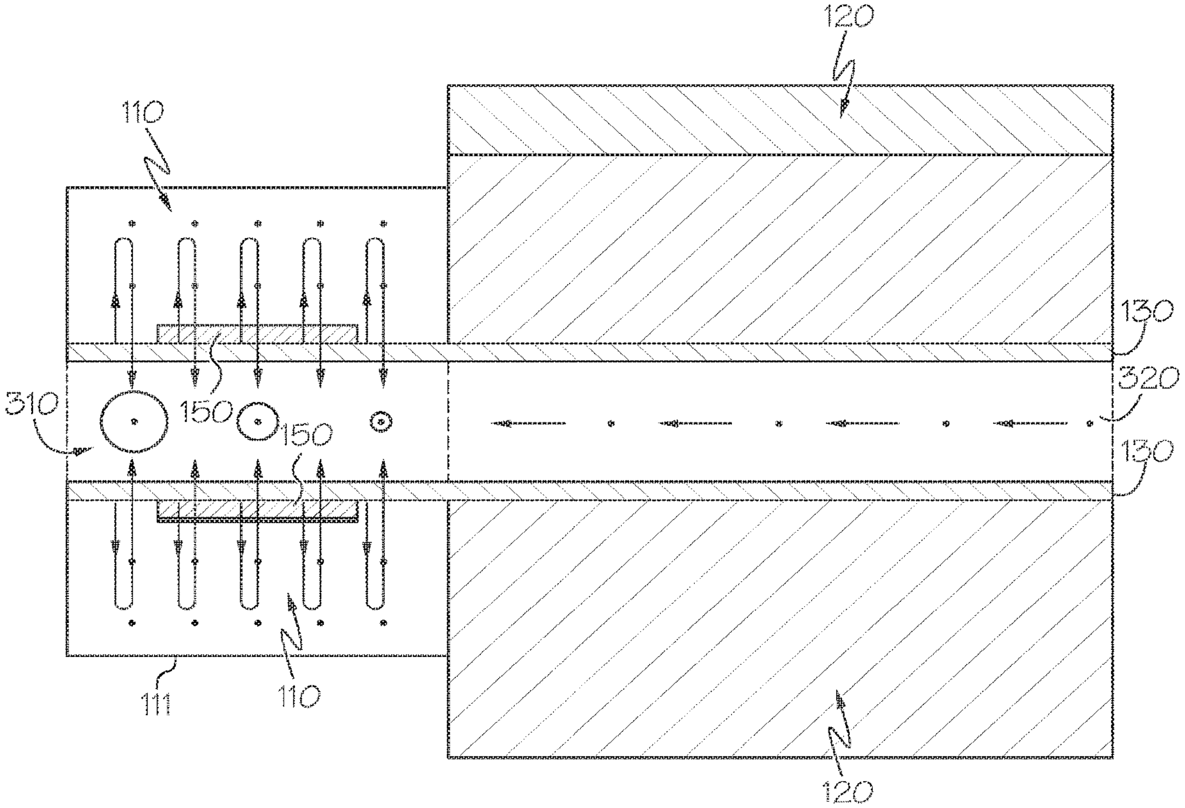
FIG. 3 depicts generation of droplets using super-saturation condition according to one or more embodiments shown and described herein.

FIG. 3 depicts generation of droplets using super-saturation condition according to one or more embodiments shown and described herein. The operation and operational parameters of the continuous droplet generators will now be described. One issue regarding the design of a droplet generator may be the sustainability of supersaturated conditions inside the tube 130 that facilitate particle growth by condensation. The saturation ratio (or Supersaturation) may be defined by:

$$SR = \frac{p_v}{p_{sat}(T)}, \quad \text{Equation 2}$$

where, $p_v$ is partial pressure of vapor, $p_{sat}(T)$ is saturation pressure of vapor at temperature T . For water, the saturation ratio may be further defined by the ratio of the actual specific humidity to the specific humidity of saturated at the same temperature. If the resulting value is less than one, the condition is considered unsaturated. If the resulting value is equal to one, the condition is saturated. If the resulting value is greater than one, the condition is considered supersaturated. Supersaturation means that vapor exceedingly exists at a given temperature. Exposure of particles to supersaturated vapor results in vapor deposition in the form of absorption coupled with vapor condensation causing the droplets to grow about the particles.

The efficacy of the continuous droplet generator to nucleate particles depends upon the flow field and the thermal and mass transport inside evaporation-condensation tube. The rate of growth of droplets induced by a particle when the initial particle size is less than the mean gas free path is governed by the rate of random molecular collision of vapor molecules. The rate of collisions may be given by the kinetic theory of gases:

$$\frac{dD_p}{dt} = \frac{2M(p_v - p_d)}{\rho_p N_a \sqrt{2\pi mkT}} \text{ for } D_p < \lambda, \quad \text{Equation 3}$$

where M is molecular weight of liquid, m is mass of a vapor molecule, $\lambda$ is particle-containing gas mean free path, $\rho_p$ is density of particle, t is time, k is gas constant per molecule, and Na is Avogadro's constant.

For particles larger than the gas mean free path, growth does not depend on the rate of random molecular collisions but rather on the rate of diffusion of molecules to the droplet surface. This is analogous to the coagulation of aerosol particles:

$$\frac{dD_p}{dt} = \frac{4Diff_v M(p_v - p_{sat})}{\rho_p D_p RT} \text{ for } D_p > \lambda, \quad \text{Equation 4}$$

By referring to FIG. 3, the area 310 within the tube 130 becomes supersaturated after the vapor in the first chamber 110 continuously flows into the gas flow channel of the tube 130 due to the pressure difference between the first chamber 110 and the area 310. Thus, when gas containing particles enter the area 310 which is supersaturated, vapor in the area 310 condenses on particles and on droplets containing particles.

Figure 7:
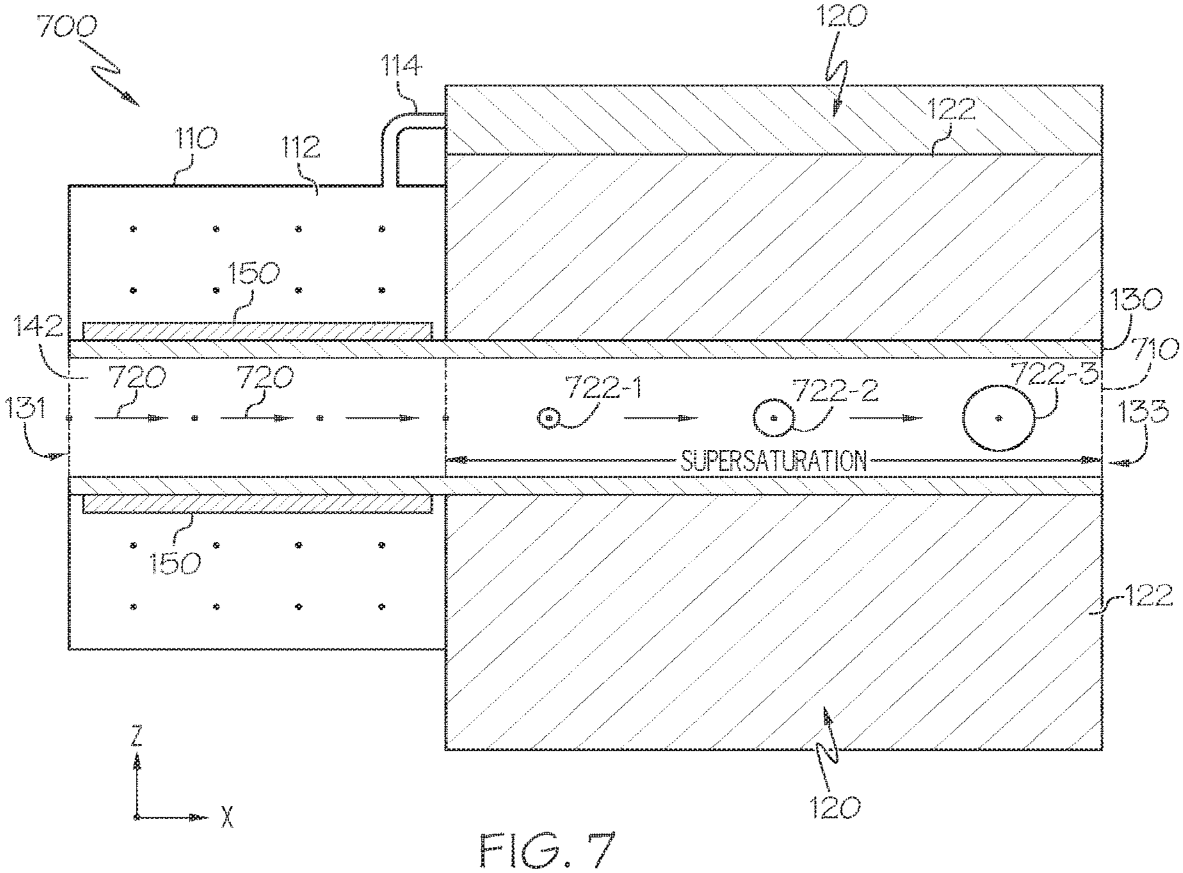
FIG. 7 illustrates the phase change of liquid contained in the tube and vapor driven into the gas flow channel by pressure, according to another embodiment shown and described herein.

FIG. 7 illustrates the phase change of liquid contained in the tube 130 and vapor driven into the gas flow channel by pressure, according to another embodiment shown and described herein.

The droplet generator 700 is the same as the droplet generator 100 shown in FIGS. 1A and 1B. In this embodiment, the liquid 122 contained in the second chamber 120 may be water or alcohol. As opposed to the embodiment shown in FIG. 1B where the particle-containing gas flow 140 flows into the gas flow channel 142 by entering the second opening 131, in this embodiment, the particle-containing gas flow 720 flows into the gas flow channel 142 by entering the first opening 133. The liquid 122 in the second chamber 120 is absorbed by the tube 130 and moves toward the first chamber 110. Then, the liquid in the tube 130 at the first chamber 110 may be phase-changed into vapor by the heater 150 and the vapor flows into the first chamber 110. The vapor in the first chamber 110 is then delivered toward the gas flow channel 142 via the pores of the tube 130 because the vapor pressure in the first chamber 110 is higher than the vapor pressure in the gas flow channel 142, as described above.

As the particle-containing gas flow 140 traverses the gas flow channel 142 in +x direction, condensed droplets are formed upon the particles, for example, droplets 722-1, 722-2, and 722-3 which then exit the gas flow channel 142 at the first opening 133 on a continuous basis. As opposed to the super-saturation area 310 in FIG. 3, in this embodiment, an area 710 in FIG. 7 becomes supersaturated because of the characteristics of alcohol. In this embodiment, the temperature of the gas containing particles decreases as the gas travels in +x direction, and vaporized alcohol may condense upon particles and droplets including particles in the gas flow channel while the vaporized alcohol travels through the area 170.

Figure 8:
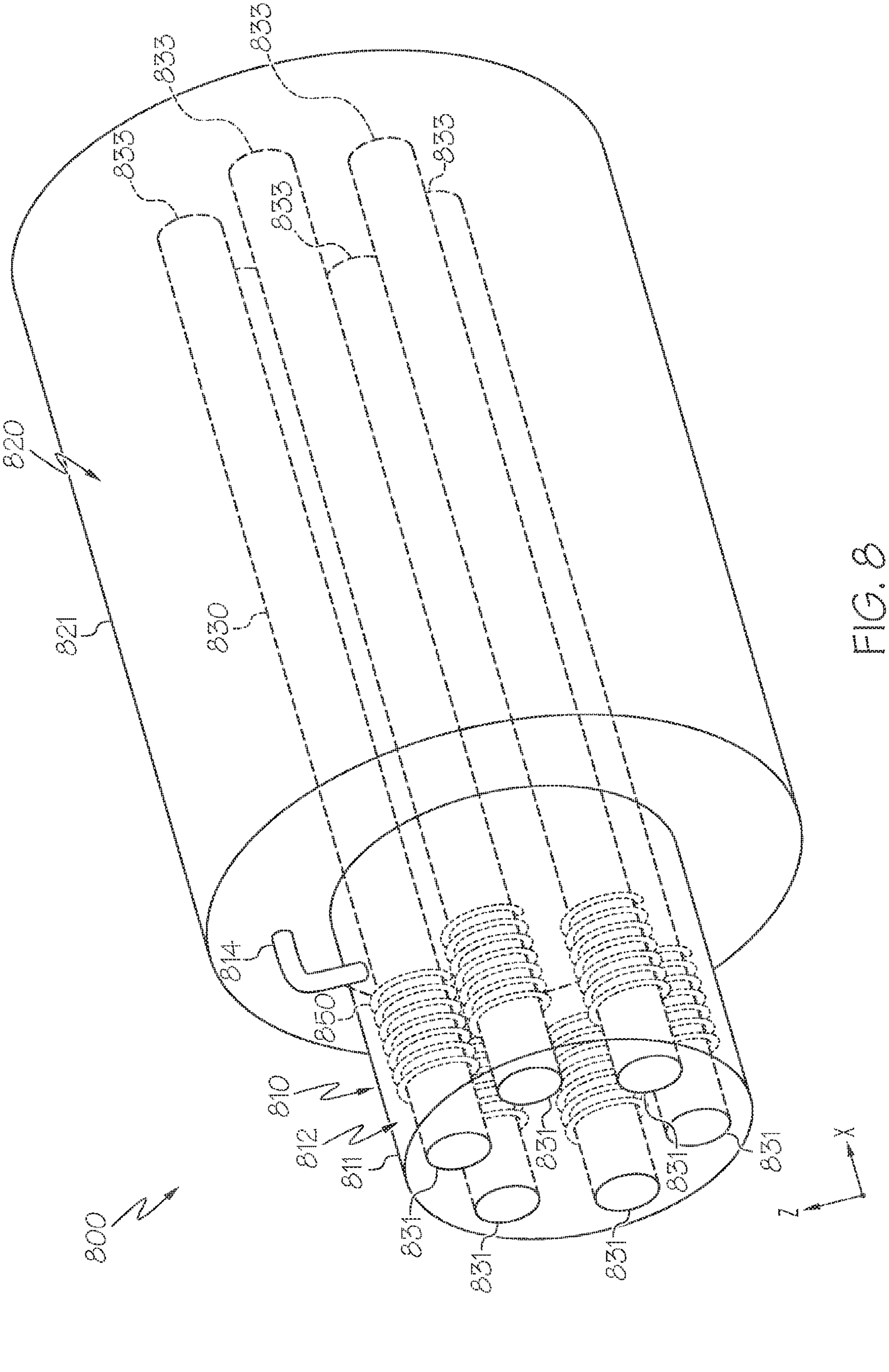
FIG. 8 depicts a droplet generator including a plurality of tubes, according to another embodiment shown and described herein.

FIG. 8 depicts a droplet generator 800 including a plurality of tubes, according to another embodiment shown and described herein.

The illustrated embodiment generally comprises a first chamber 810, a second chamber 820, a plurality of tubes 830, and a plurality of heaters 850. As shown in FIG. 8, the each of the plurality of tubes 830 extends through the first chamber 810 and the second chamber 820 along the x-axis. Each of the plurality of tubes 830 includes a first opening 833 at the side of the second chamber 820 and a second opening 831 at the side of the first chamber 810. Each of the plurality of heaters 850 is within the first chamber 810 and surrounds a portion of the outer surface of each of the plurality of tubes 830. The first chamber 810 may be connected to the second chamber 820 via a bypass channel 814. In some embodiments, the droplet generator 100 may not include the bypass channel 814.

The second chamber 820 is configured to maintain liquid 822, which may be water, any organic compound in which a hydroxyl group is bound to a carbon atom of an alkyl or substituted alkyl group including but not limited to isopropyl alcohol, butyl alcohol, methyl alcohol, ethyl alcohol, or any combination of water and such organic compounds. The liquid 822 may be absorbed by the plurality of tubes 830 in the second chamber 820 and the absorbed liquid may move in −x direction (i.e., toward the first chamber 810). Each of the plurality of heaters 850 in the first chamber 810 changes a phase of the liquid contained in each of the plurality of tubes 830 to vapor such that the vapor is provided into the first chamber 810.

The first chamber 810 includes an enclosed space 812. The enclosed space 812 is hounded by the first housing 811 and the plurality of the tubes 830. Specifically, the enclosed space 812 is bounded by the first housing 811 and the outer surfaces of the plurality of tubes 830. That is, the first chamber 810 is a cylindrical chamber and the plurality of tubes 830 pass through the first chamber 810. The second chamber 820 is bounded by the second housing 821 and the plurality of tubes 830. Specifically, the second chamber 820 is bounded by the second housing 821 and the outer surfaces of the plurality tubes 830. That is, the second chamber 820 is a cylindrical chamber and the plurality of tubes 830 pass through the second chamber 820.

The first chamber 810 and the second chamber 820 are separated from each other such that the liquid 822 in the second chamber 820 does not flow into the first chamber 810 except via the plurality of tubes 830. The second housing 821 may include a liquid inlet (not shown) to fill the second chamber 820 with the liquid 822.

Each of the tubes 830 may have the similar structure as the tube 130 described above. For example, each of the tubes 830 includes a sidewall having an outer surface and an inner surface. The sidewall may be of any suitable geometry, such as cylindrical or rectangular, for example, and may have a thickness between about 0.5 micrometers and 5 centimeters. Each of the tubes 830 has various functions. First, the tube 830 provides a separation between the liquid 822 maintained within the second chamber 820 and a gas flow channel inside each of the plurality of tubes 830. Second, the tube 830 functions as a liquid channel that allows liquid from the second chamber 820 to move toward the side of the first chamber 810 via the side wall of the tube 830 by capillary action. Third, the tube 830 provides vapor into the enclosed space 812 of the first chamber 810 when heated by the heater 850. Fourth, the tube 830 includes a plurality of pores that allow the vapor in the enclose space 812 of the first chamber 810 to pass through the pores and flow into the gas flow channel within each of the tubes 830 via diffusion and/or vapor pressure difference between the first chamber 810 and the gas flow channel.

It should now be understood that embodiments of the present disclosure may provide droplet generator devices that effectively create supersaturated areas based on vapor pressure difference. The droplet generator device includes a first chamber, a second chamber containing liquid, a tube extending through the first chamber and the second chamber, and a heater. The tube includes a sidewall having an outer surface exposed to the first chamber and the second chamber, and an inner surface, a first opening at a side of the second chamber, a second opening at a side of the first chamber, and a gas flow channel inside the tube. The tube is configured to receive the liquid from the second chamber, and the heater is operable to change a phase of the liquid contained in the tube in the first chamber to vapor such that the vapor is provided into the first chamber. The pressure in the first chamber is higher than the pressure in the gas channel. The vapor in the first chamber 110 is then delivered toward the gas flow channel 142 via one or more paths through the pore structure of the sidewall of the tube 130. The one or more paths are generated as described above with reference to FIGS. 1B and 1C. The gas flow channel becomes super-saturated due to the flow of vapor.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. A droplet generator comprising:

a chamber including an enclosed space filled with gas having vapor;

a tube extending through the chamber, the tube comprising a sidewall having an outer surface exposed to the enclosed space of the chamber, and an inner surface;

a gas flow channel inside the tube; and a heater, wherein:

the tube contains liquid;

the heater is operable to change a phase of the liquid contained in the tube to vapor such that the vapor is provided into the enclosed space;

a pressure in the enclosed space is higher than a pressure in the gas flow channel such that the vapor in the enclosed space flows to the gas flow channel by passing through the sidewall of the tube; and the tube comprises a hydrophilic layer.

2. The droplet generator of claim 1, wherein the enclosed space is bounded by a housing and the outer surface of the tube.

3. The droplet generator of claim 1, wherein the heater is a heating element configured to surround at least a portion of the outer surface of the tube within the chamber, and wherein the heater is positioned over the outer surface of the tube within the chamber.

4. The droplet generator of claim 1, wherein the heater is configured to surround the housing of the chamber.

5. The droplet generator of claim 1 wherein the heater includes a wire heater or a surface heater.

6. The droplet generator of claim 1, wherein a temperature of the outer surface of the tube is greater than a temperature of the inner surface of the tube.

7. The droplet generator of claim 1, wherein the hydrophilic layer includes a pore structure operable to provide a path for the vapor from the chamber to the gas flow channel.

8. The droplet generator of claim 7, wherein the path is generated in response to the pressure in the enclosed space becoming greater than a capillary pressure of the tube.

9. The droplet generator of claim 1, wherein the tube comprises a hydrophilic layer and a hydrophobic layer inside the hydrophilic layer, and wherein the hydrophobic layer includes a pore structure operable to provide a path for the vapor from the chamber to the gas flow channel.

10. The droplet generator of claim 1, further comprising:

a second chamber containing liquid, wherein:

the tube extends through the chamber and the second chamber;

the outer surface of the tube is exposed to the liquid in the second chamber; and the tube includes a first opening at a side of the second chamber, and a second opening at a side of the chamber.

11. The droplet generator of claim 10, wherein:

the first opening is configured to receive a gas flow including particles; and the second opening is configured to export generated condensed droplets.

12. The droplet generator of claim 10, wherein the second opening is configured to be coupled to one or more sensing devices; and the sensing device comprises one or more of the following: a particle collector, a particle counter, a particle analyzer, a chemical analyzer, a bio-marker analyzer, and a bio-species analyzer.

13. The droplet generator of claim 10, wherein the chamber is connected to the second chamber via a bypass channel.

* * * * *